Figures 1, 2:
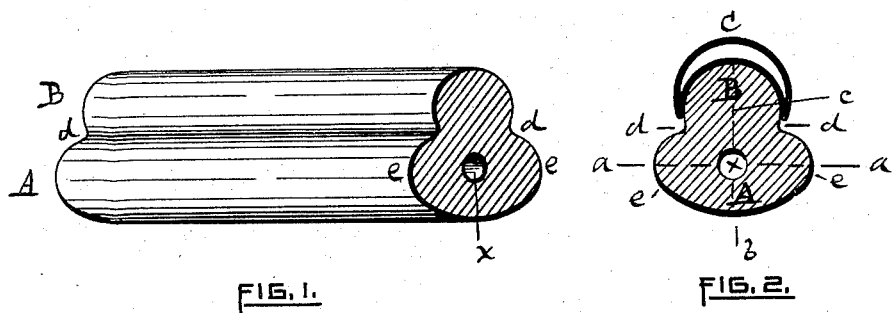

(No Model.)

E. F. RYDER.
BICYCLE TIRE.

No. 493,650. Patented Mar. 21, 1893.

WITNESSES.  INVENTOR.

Edgar F. Ryder

UNITED STATES PATENT OFFICE.

EDGAR F. RYDER, OF PROVIDENCE, RHODE ISLAND, ASSIGNOR, BY DIRECT AND MESNE ASSIGNMENTS, TO THE ATLANTIC MANUFACTURING COMPANY, OF SAME PLACE.

BICYCLE-TIRE.

SPECIFICATION forming part of Letters Patent No. 493,650, dated March 21, 1893.

Application filed September 10, 1891. Renewed February 3, 1893. Serial No. 460,909. (No model.)

*To all whom it may concern:*

Be it known that I, EDGAR F. RYDER, of the city and county of Providence, in the State of Rhode Island, have invented a certain new and useful Improvement in Elastic Tires for Bicycles and other Vehicles; and I declare the following to be a specification thereof, reference being had to the accompanying drawings.

Like letters indicate like parts.

Figure 1 is a perspective view of my invention. Fig. 2 is a transverse section of the same and of the metallic rim of the wheel.

My invention relates to that class of tires, commonly called "cushion tires" and is especially adapted to bicycles and velocipedes; but is also applicable to other vehicles.

It consists in the peculiar shape of the tire, the enlarged portion of which is elliptical in cross section, with a longitudinal rib upon one side on the line of the minor transverse axis of the elliptical portion, which rib fits into the concave portion of the metallic rim of the wheel, as hereinafter specified.

As shown in the drawings, the tire, which is preferably made of india rubber, has its larger portion A, essentially elliptical in cross section with a longitudinal bore $x$ located at the intersection of the transverse axes $a$ and $b$. The smaller portion B is substantially cylindrical in cross section, having its center at $c$ on the transverse axis $b$, and extended until it meets the sides of the elliptical portion A at $d$. The metallic rim of the wheel is shown at C. The portions A B are integral, forming a tire with a central bore and a longitudinal rib to enter the concavity of the metallic rim of the wheel, where it is held in position by cement, as usual.

It has been common heretofore to use upon bicycles and similar vehicles, a tire, either solid or tubular, which fits into the concavity of the metallic rim and is there cemented; but which projects outwardly from said rim in the plane thereof. Such tires are too rigid because so large a proportion of the surface is held to the metallic rim. The inclosed part of the tire has no elasticity whatever, because confined by the metallic rim, and the only portion of the tire which is elastic, is the part which is external to the rim.

In my improved tire I have the rib B formed with a cylindrical surface to fit the concavity of the rim C; but the portion A is elliptical cross section with its major axis $a$ at a right angle to the plane of the wheel. The bore $x$ which is usually located wholly or partially between the flanges of the rim, is in my device located at a considerable distance beyond the rim, so that the tire easily "cushions" or spreads laterally, and as there is nothing to resist this lateral spreading, I have the full advantage of all the elasticity of the entire elliptical part A of the tire, which portion overhangs, as shown at $e$, and is perfectly free to yield to pressure. My tire may however be made without the bore $x$. As a consequence, a wheel having my improved tire presents a broad and superior holding surface to the ground, and is less liable to slip on stones or pavements than a cylindrical or tubular tire. The overhanging portion readily adapts itself to the inequalities of the surface of the ground and conforms to them. Thus in turning corners or running upon small obstructions in the road, the tire yields instead of swinging the wheel aside and thus insures the greater safety of the rider. As the diameter of the concavity of the groove of the rim C is considerably less than the major axis of the elliptical portion A of the tire, it is apparent that the overhanging sides $e$ of the enlarged portion A project laterally for a sufficient distance to protect the wheel rim from abrasion or breakage. I continue the cylindrical surface of the rib B for a short distance beyond the flanges of the rim C, as seen at $d$, so as to allow for the cushioning of the tire and to prevent the cutting of the rubber by the edges of the flanges. By this form and arrangement of the tire, it cushions both on the upper and lower parts of the elliptical portion, giving a degree of elasticity heretofore unequaled in tires of this class.

A great advantage possessed by my improved tire is that, while it is a "cushion tire," it can be fitted to the rim of any bicycle of the common styles and sizes. These wheels are adapted to a solid, cylindrical tire, which has a surface corresponding to the concave surface of the rim. In such cases, the radius of the tire is the same as the radius of said concave portion of the rim. Now, if it is desired to fit a bicycle wheel with a "cushion tire," (as such tires are of a much larger diameter than a solid tire, on account of their tubular construction,) it has been hitherto necessary to cut off the metallic rim of the wheel and to substitute for it another rim, whose concavity is of a larger radius, that is, equal to the radius of the cushion tire itself. This change is very costly but is rendered unnecessary by the use of my improved tire. The rib B is made with a diameter suitable to fit the concavity of the rim, or, in other words, its curve is the same as the curve of a solid tire. But the portion A has its outer curve as large as the curve of a "cushion tire," and when it is compressed, as in use, it cushions out to an extent equal or approximating to that of a "pneumatic tire" and thus gives an increasing ease and elasticity. It is, therefore, apparent that I can use a solid tire or a cushion tire, interchangeably, with the same wheel and rim, without changing anything but the tire itself.

I claim as a novel and useful invention and desire to secure by Letters Patent—

The improved elastic tire for bicycles and other vehicles herein described, consisting of the enlarged portion A, elliptical in cross section, and having the longitudinal bore $x$ and the overhanging sides $e$, in combination with the solid, longitudinal rib B at one side upon a line in continuation of the minor transverse axis of the portion A and adapted to fit within the concave periphery of the wheel rim, substantially as specified.

EDGAR F. RYDER.

Witnesses:
HENRY J. DOUGHTY,
DANIEL W. FINK.